United States Patent
Ward

(10) Patent No.: US 11,002,550 B2
(45) Date of Patent: May 11, 2021

(54) PADDLING MAP

(71) Applicant: Maritime Planning Associates, Inc., Newport, RI (US)

(72) Inventor: Matthew Ward, Newport, RI (US)

(73) Assignee: Maritime Planning Associates, Inc., Newport, RI (US)

(*) Notice: Subject to any disclaimer, the term of this patent is extended or adjusted under 35 U.S.C. 154(b) by 421 days.

(21) Appl. No.: 15/626,744

(22) Filed: Jun. 19, 2017

(65) Prior Publication Data
US 2017/0370727 A1    Dec. 28, 2017

Related U.S. Application Data

(60) Provisional application No. 62/353,253, filed on Jun. 22, 2016.

(51) Int. Cl.
*G01C 21/20* (2006.01)
*G09B 29/00* (2006.01)
*G06F 3/0482* (2013.01)

(52) U.S. Cl.
CPC ......... *G01C 21/203* (2013.01); *G09B 29/007* (2013.01); *G06F 3/0482* (2013.01)

(58) Field of Classification Search
CPC .... G01C 21/203; G09B 29/007; G06F 3/0482
See application file for complete search history.

(56) References Cited

U.S. PATENT DOCUMENTS

| | | | | |
|---|---|---|---|---|
| 2003/0084011 A1* | 5/2003 | Shetty | ............ | G06N 3/126 706/13 |
| 2014/0172135 A1* | 6/2014 | Eisner | ............ | G06F 15/17306 700/91 |
| 2017/0255198 A1* | 9/2017 | Rodriguez | ............ | G05D 1/0274 |

* cited by examiner

*Primary Examiner* — Christian Chace
*Assistant Examiner* — Jordan S Fei
(74) *Attorney, Agent, or Firm* — Fish & Richardson P.C.

(57) ABSTRACT

Methods, systems, and apparatus, including computer programs encoded on computer storage media, for identifying a paddle region. One of these method includes generating a map of a paddle region for a paddler of an aquatic device based on weather, nautical conditions, experience level of the paddler, and the duration of the trip; and presenting the map to the user on a computer device.

19 Claims, 5 Drawing Sheets

Figure 2. High level PaddleBack architecture, primarily focusing on the back-end.

PADDLING MAP

CROSS-REFERENCE TO RELATED APPLICATIONS

This application claims priority to U.S. application Ser. No. 62/353,253, filed on Jun. 22, 2016.

BACKGROUND

Paddle boarding participants are propelled by a swimming motion using their arms while lying, kneeling, or standing on a paddleboard or surfboard in the ocean. Stand up paddle surfing and stand up paddle boarding are sports originating in Hawaii as an offshoot of surfing. Unlike traditional surfing where the rider is sitting until a wave comes, stand up paddle boarders maintain an upright stance on their boards and use a paddle to propel themselves through the water.

SUMMARY

This specification describes technologies relating to aquatic exercise.

In general, one innovative aspect of the subject matter described in this specification can be embodied in methods that include the actions of generating a map of a paddle region for a paddler of an aquatic device based on weather, nautical conditions, experience level of the paddler, and the duration of the trip. The method includes the actions of presenting the map to the user on a computer device.

Particular embodiments of the subject matter described in this specification can be implemented so as to realize one or more of the following advantages. A user may be provided with an area within which the user may paddle and return to shore within the allotted time.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Paddle boarding and kayaking are popular forms of recreation and exercise. They provide an excellent opportunity for the participant to exercise while enjoying a natural environment. Like many outdoor activities, like running and hiking, these activities cannot be stopped at any time, but instead must be planned and scheduled. However, unlike land based sports, travel while paddle boarding and kayaking are subject to water currents and tides. Therefore, it is difficult for a user to determine how long it will take to get back, making planning difficult.

Further, different individuals have different levels of ability. An expert paddler may be able to paddle more quickly than an intermediate paddler and may be able to handle rougher conditions. While a novice paddler may be slower than an intermediate paddler and may need calmer conditions.

The system described below can process complex data obtained from different sources to help a user plan a paddle board or kayaking trip.

Figure 1:
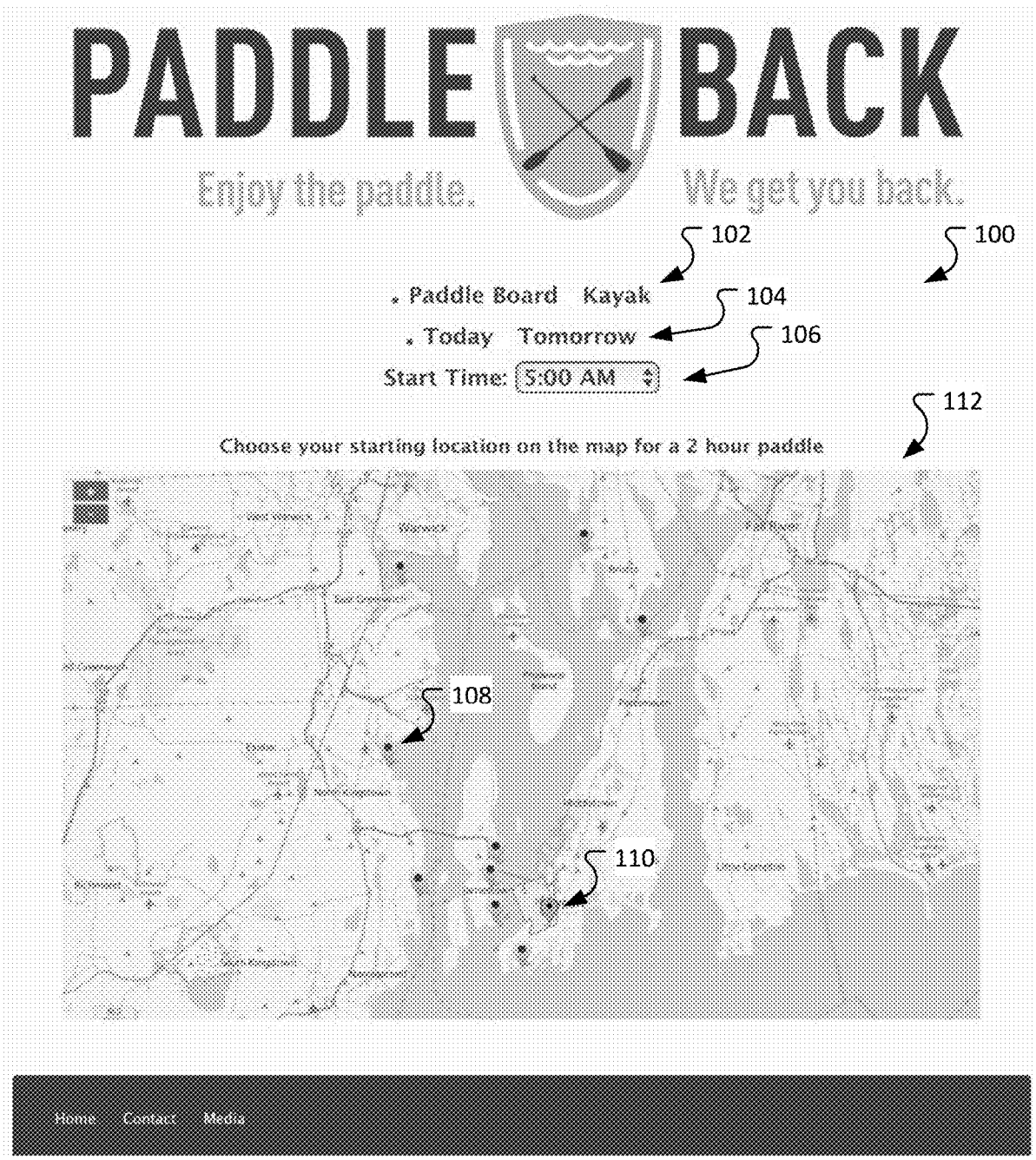
FIG. 1 is an example of a user interface that enables a user to interactively provide input to a system that assists in the planning of a trip.

Referring to FIG. 1, a user interface 100 can enable a user to interactively provide input to a system that assists in the planning of a trip. The user interface 100 can be a web map client designed to minimize user interaction by asking the user three simple questions:

1. What type of craft will you be paddling? (Paddle Board or Kayak) 102
2. When do you want to go? (Today or Tomorrow) 104
3. What time do you want to go? 106

Once the user has answered the questions they then select a launch site from the map and are presented with a polygon representing the preferred paddle region for a two-hour period (shown below with respect to FIGS. 3 and 4). This region implies to the user that if they paddle anywhere within this region for ½ of the overall paddle time (in this case 1 hour) they are more than likely to make it back to their start point by the end of the total time allotted.

The user interface presents a map 112 of a water area. The area presented may be selected by the user (for example, using a drop down menu of available areas, an area near the GPS location of the user, or a combination of the two. For example, the user may be presented with a list of water areas within a 10, 15, 20, or 50 mile radius of the GPS location of the user).

The map includes predetermined launch points (for example, launch point 108.) When a user selects the launch point the color of the lauch point may be changed to indicate that the launch point has been selected (for example, selected launch point 110).

In some implementations, a user may be able to specify additional information. For example, a user may be able to specify the length of the trip. The user may also be able to specify a degree of expertise they have with the selected paddle sport (for example, novice, intermediate, or expert). In some implementations, a user may be able to select their own launch point. The user may be able to input single or multiple desired paddle paths (via waypoints) to determine which is best for their daily goals.

Using the inputs, the system can determine a portion of the water area that the user may be able to visit within the duration of their trip, as discussed further below.

Figure 2:
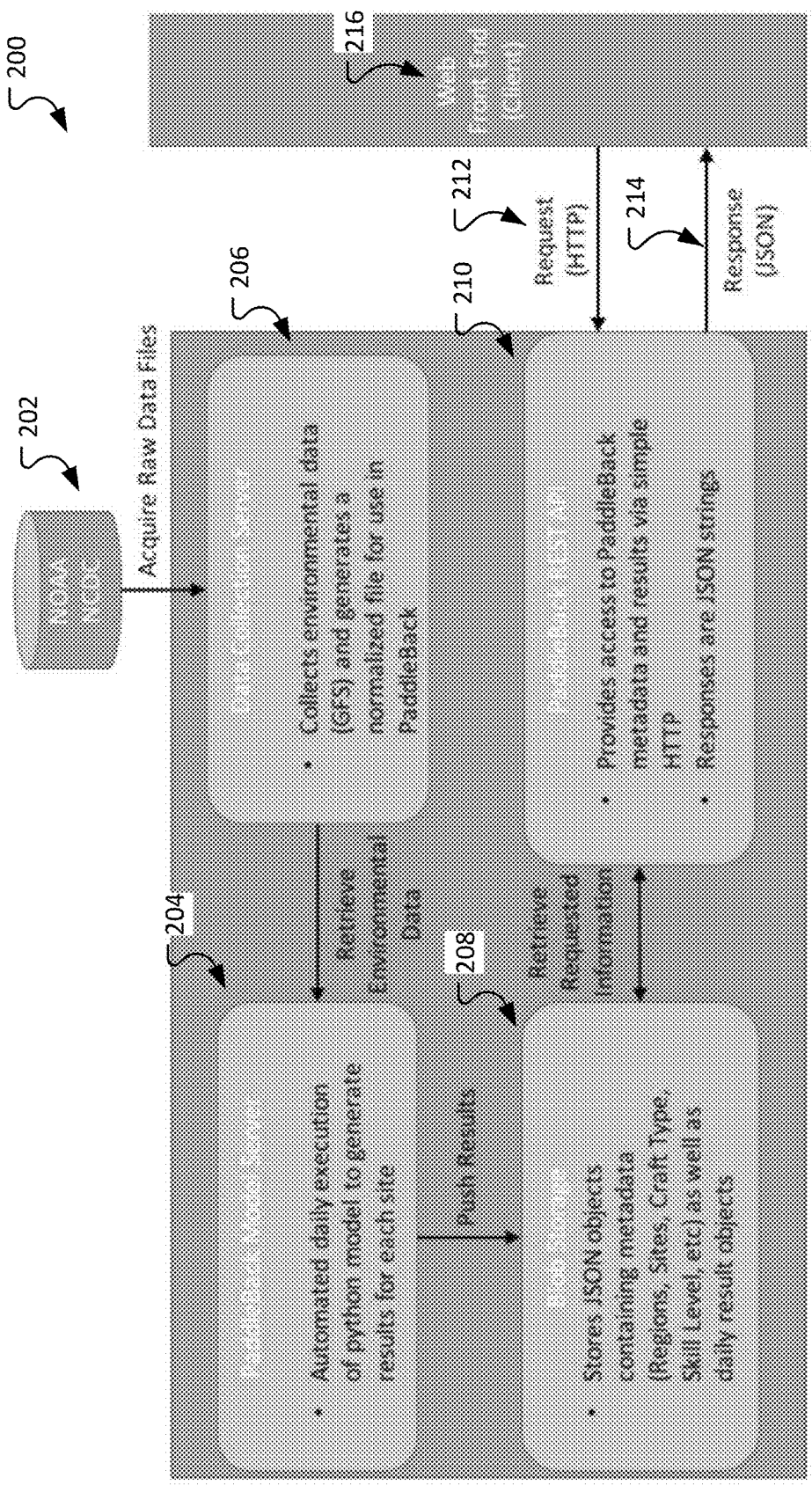
FIG. 2 illustrates an example of a planning system.

FIG. 2 illustrates an example of a planning system 200. The system 200 can obtain data files that include information about tides, nautical charts, weather, currents, etc. Some of the data may be obtained from the National Oceanic and Atmospheric Administration (NOAA) and the National Climate Data Center (NCDC).

A data collection server 206 retrieves environmental data from sources external to the system 200 (such as a MPA Tidal Harmonics Database) and can be a complete data management solution, able to manage high volume, large scale data with configurable automated processes. The architecture is scalable and allows for limitless customization. The solution is driven by disparate, loosely-coupled applications that take advantage of service oriented architecture concepts. In general, a service-oriented architecture (SOA) is an architectural pattern in computer software design in which application components provide services to other components via a communications protocol, typically over a network. A service is a self-contained unit of functionality. Each of the individual components can exist alone or as part of the full array of services. Additional services are easily added or modified without affecting the overall architecture. For example, the server may be configured to collect NOAA atmospheric forecast data via service protocols specified by NCDC. The server may be configured to obtain information for specific locations (such as the Narragansett Bay region) based on the water areas supported by the system.

The model server 204 can process the information collected by the data collection server 206. The model server 204 may use a hydrodynamic model of the water area. The hydrodynamic model may simulate the tidally induced currents within the water area. The hydrodynamic model can be constrained by shoreline features and bathymetry of the water area as well as using tidal harmonics to address regions in which the water area interacts with another body of water, such as the ocean.

The hydrodynamic model can be developed using, for example, the DELFT3D MODELING SUITE to simulate the tidally induced currents within the water area. In some implementations, the model may be verified by running the model for an extended period of time to capture the full range of tidal dynamics within the water area.

Once the model is fully verified and validated the results at each computational grid cell can be decomposed into their harmonic constituents (similar to methods used to decompose tidal elevations). This approach results in a very compact file that can be used to predict the tidal currents over a period of years. The use of this technique improves the computational efficiency of the system as it saves memory and data storage resources.

The model server 204 may also include a model to represent the capabilities of the paddler. One such model is a Lagrangian particle transport model that incorporates hydrodynamic and meteorological forcing to determine the maximum extent to which a paddler can travel within a given temporal window while still being able to return to their starting location.

Each particle in the model has a velocity (p_vel) where the speed is determined by the Skill Level of the paddler and the Craft Type being used, (for example, an intermediate paddler may be configured to have a 1 kt paddling speed for a Paddle Board and 2 kt paddling speed for a kayaker). The heading is also influenced by the Skill Level of the paddler by application of a "drift factor", which simulates the ability of the paddler to stay true to their intended course.

The hydrodynamic (curr_vel) and meterological (wind_vel) velocities can be provided by the data collection server, (for example, the hydrodynamic and meteorological velocities may be provided by the MPA Tidal Harmonics Database and GFS respectively). The forcing data can be extracted based on the location of the particle at a given timestep. The Craft Type can determine the leeway factor, which is the percentage of the wind velocity that influences the particle. The distance traveled by the particle in one model timestep is given by:

$$dist = (p\_vel + curr\_vel + (wind\_vel * leeway\_factor)) * model\_timestep.$$

The model can account for the "free will" of a paddler by applying a random rotation to the heading of each particle at each timestep. The angle of rotation is randomly chosen from a uniform range (between 0 & 15 degrees) and applied relative to the current heading. Additionally, there is a periodic, random rotation of a larger magnitude (between 60 & 90 degrees) which is applied to a random subset of particles. This facilitates the models ability to handle geographic features such as peninsulas and small embayments. Particles impacting the shoreline are redirected away at a random angle from the inverse of their approach angle, with a slightly reduced speed. Once the half-way point of the temporal window has been reached, the heading of the particle is adjusted to point towards the starting location at each timestep. All other calculations remain unchanged.

During the production cycle hundreds of paddlers are released from each launch. To account for both environmental variability and the free will of the paddler. Those paddlers that make it back to the launch site within the prescribed time window are deemed successful and their paths within the water are used to form the area of preferred paddling.

On an automated schedule the model server 204 can automatically retrieve required environmental information from the Data Collection Server 206 and executes the water craft mobility models described above for all established launch sites with the region of interest (for example, for Narragansett Bay) and pushes the results to the Blob Storage 208 for retrieval by the user interface.

The blob storage 208 can store JavaScript Object Notation objects (JSON) containing metadata (regions, sites, craft types, skill levels) as well as the results described above. In some implementations, other data structures may be used.

A web front end 216, such as a user interface executing in a web browser or other application, can communicate with the system using conventional Hypertext transport protocol (HTTP) requests. The web front end 216 may call an application program interface (API) 210 that provides access to the server. In response, the web front end 216 receives data (for example, in the form of JSON strings) that the user interface can use to display the results to the user, as described further below.

Figure 3:
FIGS. 3-4 illustrates an example of a user interface presenting a paddling area to a user.

FIG. 3 illustrates an example of a user interface 300 presenting a paddling area 310 to a user. In this example, the user has provided information indicating that they wish to paddle board 302 today 304 at 5:00 AM 306 for 2 hours (in this example, the duration is not configurable, but is indicated by the text on the user interface 300).

The user has selected a departing location 308. The web client displays the preferred paddle region 310. In this example, the tides are falling with moderate currents and a persistent 6-7 kt wind out of the north.

Figure 4:
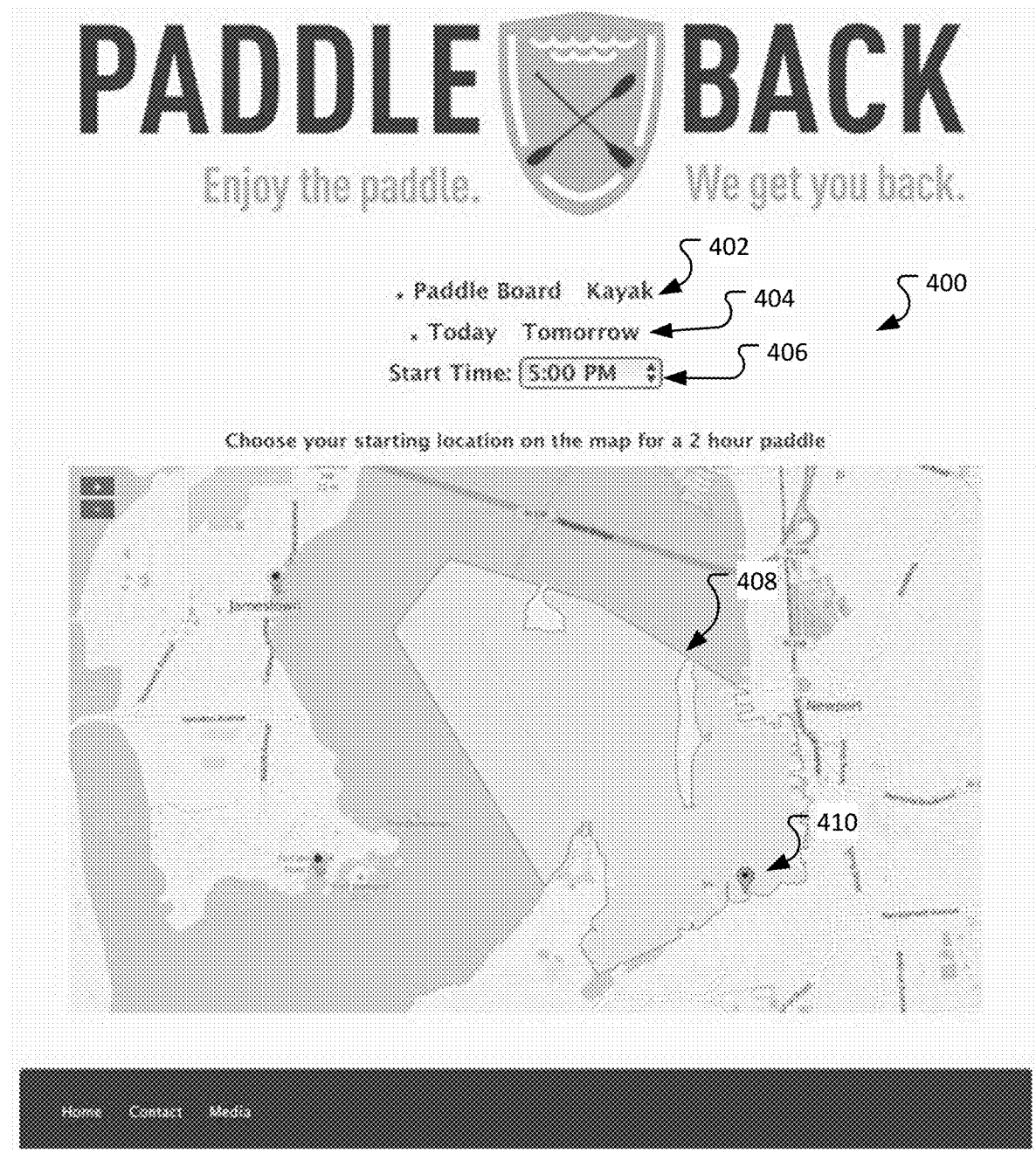

In contrast, the preferred paddle region 408 of FIG. 4 is smaller. In the example user interface 400 presented in FIG. 4, the user has provided information indicating that they wish to paddle board 402 tomorrow 404 at 5:00 PM 406 for 2 hours. At that time, the tide is changing from high to low resulting in very low current speeds with a strong persistent wind of 20 kt out of the north-northeast. As a result, the preferred paddle region 408 is noticeably smaller than the preferred paddle region 308 of FIG. 3.

It is worth noting that the water craft mobility model organically attempts to send the user into the wind and currents as they start, thus ensuring that they will be able to leverage the environmental conditions for their return voyage. This becomes clear between the two results sets—during the 5 am profile the paddler is presented with relative benign environmental conditions allowing for a much greater northward voyage while during the 5 pm profile the winds have picked up significantly greatly reducing their overall preferred paddle region.

In some implementations, the user interface may identify the location of the user on the map. For example, if the user interface is paired to a device that includes a GPS, or the GPS location of the user is otherwise provided to the user interface and/or backend system, the system may identify the location of the user on the map. In some implementations, the system may alert the user if they have moved beyond the preferred paddle area, notifying the user that they should head back into the preferred paddle region if they wish to maintain their original schedule.

In some implementations, the map may be updated during the paddling trip (either manually or automatically). As the trip progresses, the area of the polygon may shrink (for example, once the user has passed the half way point) reflecting the amount of time remaining to return to shore within the allotted time limit.

The system utilizes multiple techniques to improve the operational efficiency of a computer system. For example, restricting the number of launch sites to a predetermined list of launch sites reduces the number of computations and memory usage that the system has to perform in order to provide the service. Decomposing the computational girl cell into harmonic constituents to generate a compact file reduces the amount of memory required to process the data to arrive at the required results.

Figure 5:
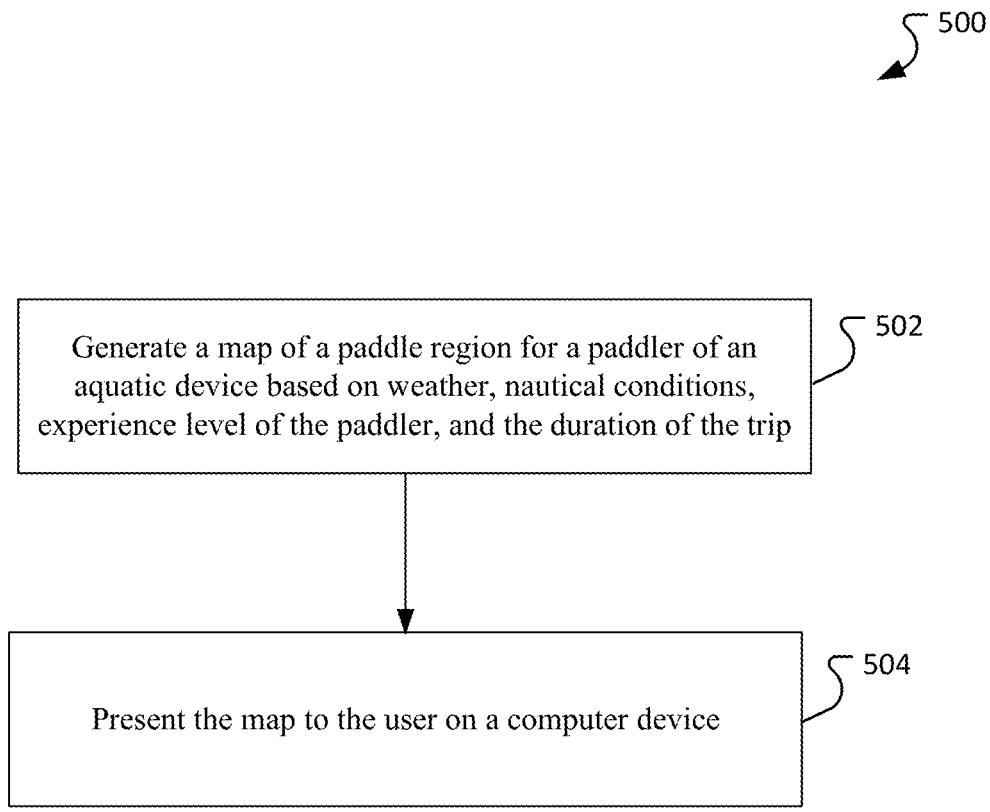
FIG. 5 is a flowchart of an example of a process for identifying a preferred paddle region.

FIG. 5 is a flowchart of an example of a process 500 for identifying a preferred paddle region. The process may be performed by a computer system.

The process 500 generates 502 a map of a paddle region for a paddler of an aquatic device based on weather, nautical conditions, experience level of the paddler, and the duration of the trip.

The process 500 presents (display) 504 the map to the user on a computer device. The user interface may be presented to the user using, for example, a web browser operating on a personal computer (desktop or laptop), a table, a cell phone, a smart watch, a wearable computation device, or any other device that enables the input and output of data.

Embodiments of the subject matter and the functional operations described in this specification can be implemented in digital electronic circuitry, tangibly-embodied computer software or firmware, computer hardware (including the structures disclosed in this specification and their structural equivalents), or in combinations of one or more of them. Embodiments of the subject matter described in this specification can be implemented as one or more computer programs (i.e., one or more modules of computer program instructions encoded on a tangible non-transitory program carrier for execution by, or to control the operation of, data processing apparatus). The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example, a programmable processor, a computer, or multiple processors or computers. The apparatus can also be or further include special purpose logic circuitry (e.g., an FPGA (field programmable gate array) or an ASIC (application-specific integrated circuit)). In addition to hardware, the apparatus can optionally include code that creates an execution environment for computer programs (e.g., code that constitutes processor firmware, a protocol stack, a database management system, an operating system, or a combination of one or more of them).

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document, in a single file dedicated to the program in question, or in multiple coordinated files (e.g., files that store one or more modules, sub-programs, or portions of code)). A computer program can be deployed so that the program is executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry (e.g., an FPGA (field programmable gate array) or an ASIC (application-specific integrated circuit)).

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks), however, a computer need not have such devices. Moreover, a computer can be embedded in another device (e.g., a mobile telephone, a personal digital assistant (PDA), a mobile audio or video player, a game console, a Global Positioning System (GPS) receiver, or a portable storage device (e.g., a universal serial bus (USB) flash drive), to name just a few).

Computer-readable media suitable for storing computer program instructions and data include all forms of non-volatile non-transitory memory on media and memory devices, including by way of example semiconductor memory devices (e.g., EPROM, EEPROM, and flash memory devices), magnetic disks (e.g., internal hard disks or removable disks), magneto-optical disks, and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback) and input from the user can be received in any form, including acoustic, speech, or tactile input. In addition, a computer can interact with a user by sending documents to and receiving documents from a device that is used by the user, for example, by sending web pages to a web browser on a user's device in response to requests received from the web browser.

Embodiments of the subject matter described in this specification can be implemented in a computing system that includes a back-end component (e.g., as a data server), or that includes a middleware component (e.g., an application server), or that includes a front-end component (e.g., a client computer having a graphical user interface or a web browser through which a user can interact with an implementation of the subject matter described in this specification), or any combination of one or more such back-end, middleware, or front-end components. The components of the system can be interconnected by any form or medium of digital data communication (e.g., a communication network). Examples of communication networks include a local area network (LAN) and a wide area network (WAN) (e.g., the Internet).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a user device (e.g., for purposes of displaying data to and receiving user input from a user interacting with the user device), which acts as a client. Data generated at the user device (e.g., a result of the user interaction) can be received from the user device at the server.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
   receiving data indicative of a selection of a launch location in an environment for a paddling trip;
   receiving environment data from a weather database representing present or predicted weather of the environment, nautical conditions of the environment, an experience level of a paddler, and a time duration of the paddling trip;
   simulating, by a hydrodynamic model, in response to receiving the environment data, a plurality of paths through the environment from the launch location by the paddler with the experience level;
   determining, in response to the simulating, a perimeter of a paddle region that enables the paddler with the experience level to return to the launch location within the time duration;
   generating a map including the paddle region;
   receiving data indicating an updated location of the paddler in the environment during the paddling trip;
   updating the paddle region in the map based on the data indicating the updated position;
   generating an alert when the paddler is outside the paddle region to indicate that the paddler will be unable to return to the launch location within the time duration; and
   presenting the map including the updated paddle region and the alert on a computer device.

2. The computer-implemented method of claim 1, wherein the paddle region is a polygon.

3. The computer-implemented method of claim 1, wherein the launch location is one of a predetermined number of launch locations, and wherein the simulation is performed for each of the predetermined launch locations in advance of received a selection of the launch location.

4. The computer-implemented method of claim 1, wherein generating the map comprises:
   measuring a distance that the paddler having the experience level can paddle in a body of water subject to the weather and the nautical conditions within the time duration; and
   generating the paddle region based on the measured distance.

5. The computer-implemented method of claim 1, wherein generating the map comprises:
   simulating a path travelled by the paddler for a plurality of time steps, the number of time steps determined by the duration of the trip.

6. The computer-implemented method of claim 5, where generating the map further comprises:
   applying a periodic randomized change in a direction for the simulated path travelled by the paddler at each time step.

7. The method of claim 1, wherein simulating the plurality of paths comprises:
   dividing the environment into a computational grid;
   computing the plurality of paths through the environment for each cell of the computational grid to generate results data for each of the cells; and
   decamping the results data for each of the cells into harmonic constituents of the results data, wherein a computational efficiency of the simulation is increased and wherein a file size of the results data are decreased relative to results data that are not decomposed into harmonic constituents.

8. A non-transitory computer-readable media storing instructions which, when executed by at least one processor, cause the at least one processor to perform operations comprising:
   receiving data indicative of a selection of a launch location in an environment for a paddling trip;
   receiving environment data from a weather database representing present or predicted weather of the environment, nautical conditions of the environment, an experience level of a paddler, and a time duration of the paddling trip;
   simulating, by a hydrodynamic model, in response to receiving the environment data, a plurality of paths through the environment from the launch location by the paddler with the experience level;
   determining, in response to the simulating, a perimeter of a paddle region that enables the paddler with the experience level to return to the launch location within the time duration;
   generating a map including the paddle region;
   receiving data indicating an updated location of the paddler in the environment during the paddling trip;
   updating the paddle region in the map based on the data indicating the updated position;
   generating an alert when the paddler is outside the paddle region to indicate that the paddler will be unable to return to the launch location within the time duration; and
   presenting the map including the updated paddle region and the alert on a computer device.

9. The non-transitory computer-readable medium of claim 8, wherein the paddle region is a polygon.

10. The non-transitory computer-readable medium of claim 8, wherein the launch location is one of a predetermined number of launch locations, and wherein the simulation is performed for each of the predetermined launch locations in advance of received a selection of the launch location.

11. The non-transitory computer-readable medium of claim 8, wherein generating the map comprises:
   measuring a distance that the paddler having the experience level can paddle in a body of water subject to the weather and the nautical conditions within a time duration; and
   generating the paddle region based on the measured_distance.

12. The non-transitory computer-readable medium of claim 8, wherein generating the map comprises:
   simulating a path travelled by the paddler for a plurality of time steps, the number of time steps determined by the duration of the trip.

13. The non-transitory computer-readable medium of claim 12, where generating the map further comprises:
   applying a periodic randomized change in a direction for the simulated path travelled by the paddler at each time step.

14. A system, comprising:
   at least one processor; and
   a memory communicatively coupled to the at least one processor, the memory storing instructions which, when executed by the at least one processor, cause the at least one processor to perform operations comprising:
      receiving data indicative of a selection of a launch location in an environment for a paddling trip;
      receiving environment data from a weather database representing present or predicted weather of the environment, nautical conditions of the environment, an experience level of a paddler, and a time duration of the paddling trip;
      simulating, by a hydrodynamic model, in response to receiving the environment data, a plurality of paths through the environment from the launch location by the paddler with the experience level;
      determining, in response to the simulating, a perimeter of a paddle region that enables the paddler with the experience level to return to the launch location within the time duration;
      generating a map including the paddle region;
      receiving data indicating an updated location of the paddler in the environment during the paddling trip;
      updating the paddle region in the map based on the data indicating the updated position;
      generating an alert when the paddler is outside the paddle region to indicate that the paddler will be unable to return to the launch location within the time duration; and
      presenting the map including the updated paddle region and the alert on a computer device.

15. The system of claim 14, wherein the paddle region is a polygon.

16. The system of claim 14, wherein the launch location is one of a predetermined number of launch locations, and wherein the simulation is performed for each of the predetermined launch locations in advance of received a selection of the launch location.

17. The system of claim 14, wherein generating the map comprises:
   measuring a distance that the paddler having the experience level can paddle in a body of water subject to the weather and the nautical conditions within a time duration; and
   generating the paddle region based on the measured_distance.

18. The system of claim 14, wherein generating the map comprises:
   simulating a path travelled by the paddler for a plurality of time steps, the number of time steps determined by the duration of the trip.

19. The system of claim 18, where generating the map further comprises:
   applying a periodic randomized change in a direction for the simulated path travelled by the paddler at each time step.

* * * * *